United States Patent

[11] 3,612,280

| [72] | Inventors | Hugh J. Fitzgerald<br>Austin;<br>Ernest H. Koepf, Dallas, both of Tex. |
|---|---|---|
| [21] | Appl. No. | 4,602 |
| [22] | Filed | Jan. 21, 1970 |
| [45] | Patented | Oct. 12, 1971 |
| [73] | Assignee | Ocean Pollution Control, Inc.<br>Dallas, Tex. |

[54] OIL-SKIMMING APPARATUS
9 Claims, 3 Drawing Figs.

[52] U.S. Cl.................................................. 210/242
[51] Int. Cl........................................... B01d 21/18
[50] Field of Search............................................ 210/83,
242, 523, DIG. 21; 61/1

[56] References Cited
UNITED STATES PATENTS

| 61,880 | 2/1967 | Serrell............................ | 210/242 |
| 3,348,690 | 10/1967 | Cornelissen................... | 210/242 |

*Primary Examiner*—Reuben Friedman
*Assistant Examiner*—T. A. Granger
*Attorney*—Richards, Harris & Hubbard ABSTRACT: A pair of wing assemblies attached to opposite sides of the hull of a marine vessel, each including a cover with tensioning means engaging its outer end to keep it extended outwardly, means to support its leading edge above the water to allow oily material at the surface to pass beneath it, an angled skirt portion at its trailing edge to funnel the oily material inwardly toward the vessel, conduits at the hull of the vessel to remove the oil, and lines engaging the outer ends of the wing members for hauling them inwardly to clear lateral obstructions.

PATENTED OCT 12 1971 3,612,280
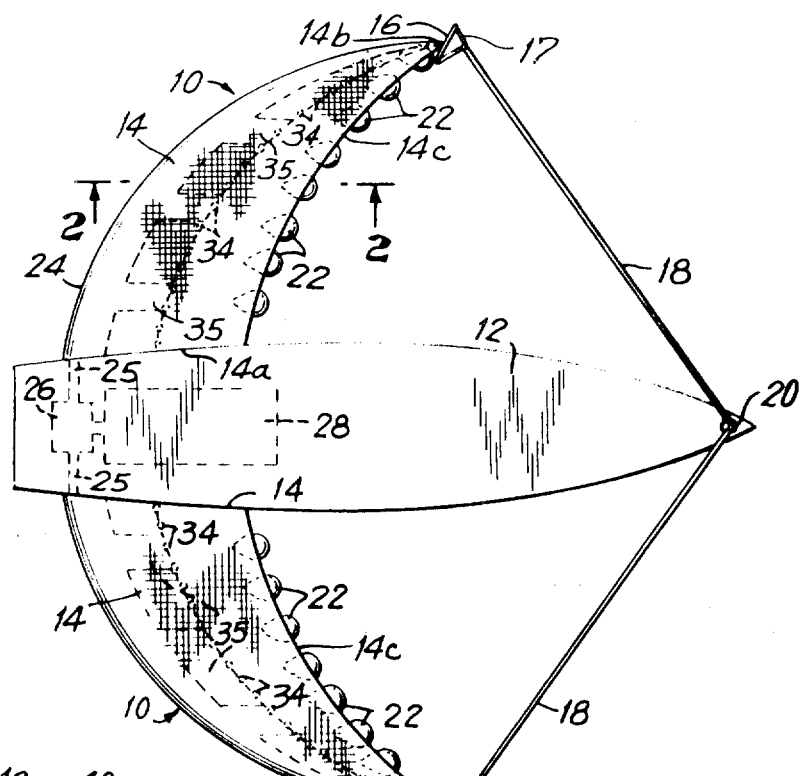
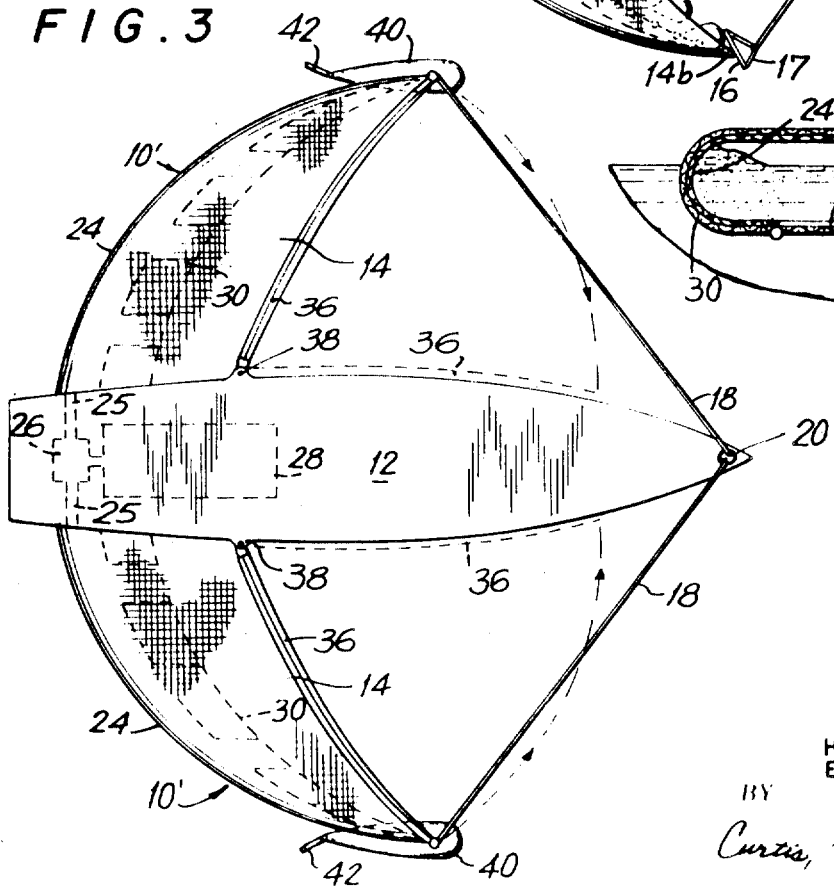
INVENTORS
HUGH J. FITZGERALD
ERNEST H. KOEPF
BY Curtis, Morris & Safford
ATTORNEYS

OIL-SKIMMING APPARATUS

This invention relates to an apparatus for removing an oil film from the surface of a large body of water.

It is well known that when oil is released in or on a large body of water, because of the immiscibility of oil with water and the fact that oil is lighter than water, the oil rises to the surface of the water in the form of a film or slick which spreads to cover a large area and which is capable of migrating considerable distances depending upon the wind and the current. Where large quantities of oil are released, for example due to the sinking or damage of an oil tanker or to escape of oil under pressure through a fissure in an otherwise impermeable formation overlying an oil reservoir or in connection with an offshore drilling operation, movement of the oil slick to adjacent coastal areas cannot only form an unsightly and messy residue on beaches, interfering with their recreational uses, but also have serious effects on aquatic birds, fish, and other marine life, as well as other adverse ecological consequences.

Until recently there has been no effective means for confining and/or removing large oil films from open bodies of water. Attempts to use detergents and other chemicals to emulsify and/or disperse the oil have for the most part proved ineffective. On the other hand, attempts to confine the oil to a limited area to prevent its dispersion, for example by a chain of logs or elongated floats connected end to end in a circle, or to skim the oil from the surface by towing means such as a chain of floats between a pair of tugboats moving on parallel courses, have proved virtually worthless due to the fact that the surface of an ocean, bay, or large inland lake is almost invariably subject to waves or choppiness which cause the oil film to be washed over the tops of the rigid floats so that most of the oil escapes.

In the copending application Ser. No. 811,713 filed Apr. 1, 1969, now U.S. Pat. No. 3,523,611 there is disclosed an apparatus for skimming an oil film from the surface of a large body of water including a towed funnel assembly with a flexible cover and side skirts of impermeable sheet material with floats to keep the leading edge of the cover spaced above the surface of the water so that the oil film will pass beneath it, with the remaining portions of the cover supported on the floating oil, a bottom panel of netting to hold the side skirts in downwardly projection position to confine the oil laterally, while permitting the water beneath it to escape freely, and a sump at the apex of the funnel to receive the oil for transfer to a storage vessel.

This apparatus is capable of efficient operation on large open bodies of water. However, its extreme size limits its maneuverability. There still exists a need for a more compact apparatus capable of operating in limited areas, such as harbors, where numerous obstructions such as docks, moored vessels, buoys, and so on, may be encountered, requiring the ability to sweep an area of irregular shape with sudden changes in either the direction of the vessel or the width of the area swept.

The present invention satisfies this need by providing apparatus including a pair of wing assemblies which are attached to opposite sides of the hull of the vessel and which are readily retractable against the sides of the vessel to clear lateral obstructions.

In the drawing:

FIG. 1 is a diagrammatic plan view of one illustrative apparatus embodying features of the present invention.

FIG. 2 is a vertical section taken on the line 2—2 of FIG. 1.

FIG. 3 is a diagrammatic plan view of an alternative form of apparatus also within the inventive concept.

The illustrative apparatus shown in FIGS. 1 and 2 includes a pair of wing assemblies 10 mounted at opposite sides of a marine vessel 12. Each of the wing assemblies 10 includes a cover 14 of highly flexible sheet material which is impermeable and impervious to oil, such as canvas, woven nylon, dacron, or similar synthetic material, which may be impregnated with or laminated to a thin film of neoprene or the like. Each cover is of a semidouble concave or sickle shape, with its wide inner end 14a connected to a flange several feed above the waterline on the side of the hull of the vessel 12 near its stern, so as to form a substantially watertight seal with the hull. The cover extends outwardly and forwardly and its tapered outer end 14b is connected to a paravane device, such as an otter board 16, which is also connected through a yoke 17 to a heavy towing line 18 which extends rearwardly and outwardly from a motor-driven winch 20 at the bow of the vessel 12. The yoke 17 keeps the otter board 16 obliquely angled outwardly and forwardly so that the forward motion of the vessel 12 will impose an outwardly directed tension on the leading edge of the cover 14 to keep it extended laterally.

The leading edge 14c of the cover 14 is reinforced by a heavy rope, for example of nylon or Dacron, which is supported on and connected to the top of a series of floats 22 which are spaced along the leading edge 14c to support it a foot or more above the surface of the water. The extreme flexibility of the cover 14 allows it to conform readily to the wave motion and chop of the water, as well as the bow wave of the vessel 12, and insure that all of the floating oily material will pass beneath it. The trailing portion of the cover 14 is supported on the floating film of oily material.

At the trailing edge of the cover 14 is a skirt portion 24 which projects downwardly for several feet below the surface of the water to trap the oily material. The inwardly and rearwardly angled direction of the skirt portion 24 funnels the oily material inwardly toward the vessel 10 as the vessel moves forwardly through the water. Located at the side of the hull of the vessel 12 just beneath the cover 14 and just forwardly of the skirt portion 24 is a conduit 25 which extends to a pump 26 which transfers the oily material to a reservoir 28. While the pump 26 and reservoir 28 are shown contained within the hull of the vessel 12, they may be remotely located, for example, in a barge towed behind the vessel, and connected to the wing assembly by a flexible pipe formed, for example, of fabric-reinforced neoprene, which extends along the outside of the hull of the vessel 12. Screens are preferably placed over the input ends of the conduits 25 to catch floating debris and prevent clogging of the conduits or damage to the pump 26.

Extending across the lower side of each of the wing assemblies is a bottom member 30 of material readily permeable to water, such as gill netting. As shown in FIG. 2, the leading edge of the bottom member 30 is reinforced by a heavy rope 32 which has attached at spaced positions along its length a series of weights 34 which keep the leading edge of the bottom member 30 submerged. The trailing portions of the bottom member 30 are held downwardly by the water pressure against them as the boat moves through the water. The trailing edge of the bottom member 30 is connected to the lower edge of the skirt portion 24 to keep the skirt portion extending downwardly well below the surface and prevent its trailing rearwardly due to the water pressure against it and thereby allowing the oily material to escape beneath it. While the oily material at the surface is trapped by the skirt portion 24, the water beneath it escapes freely through the bottom member 30. The flow resistance of the netting may be enhanced by a series of transversely spaced panels 35 of flexible sheet material, such as nylon, which is less readily permeable to water, extending fore and aft along the bottom member 30, thus insuring that the downward and forward tension imposed on the lower edge of the skirt portion 24 by the bottom member will balance the rearward and upward pressure to which it is subjected by the forward movement of the vessel. As best shown in FIG. 2, the netting 30 may extend around the skirt portion 24 and over the cover 14 to provide additional reinforcement.

When the wing assemblies are fully extended, as shown in FIG. 1, the apparatus will sweep a wide path, for example up to about 150 feet. Thus, although the vessel preferably moves at a relatively low speed, for example, 3 knots, to minimize the strain on the apparatus, a large area can be swept free of oil in a relatively short time. The direct attachment of the wing assemblies to the hull of the vessel allows good maneuverability.

When an obstruction such as a pier, a moored vessel, or buoy, etc., is encountered at either side of the path of the vessel, the wing assembly on that side of the vessel can be fully or partially retracted merely by hauling in the towline 18 on that side by means of the winch 20. This allows the width of sweep to be reduced to clear a lateral obstruction without changing the course of the vessel. After the obstruction has been cleared, the wing assembly may again be extended merely by paying out the towline 18, and allowing the otter board 16 to pull the wing assembly outwardly from the hull again.

FIG. 3 shows an alternative embodiment of the invention having wing assemblies 10' with similar covers 14, skirt portions 24 and bottom members 30. However, the leading edges of the covers 14 are attached to and supported by rigid booms 36. The inner ends of the booms 36 are attached to the rear portions of opposite sides of the hull of the vessel 12 several feet above the waterline by universal joints 38 which permit pivotal movement of the booms 36 in both vertical and horizontal planes relative to the hull. The outer ends of the booms 36 are connected to and supported by large floats 40 which are connected to towlines 18 extending forwardly and inwardly to a winch 20 at the bow of the vessel. The booms 36 are thus spaced several feet above the surface of the water along their full length to insure that substantially all of the oily material floating at the surface will pass beneath the covers 14 and be captured and funneled inwardly by the skirt portions 24. As the vessel rolls, the booms 36 pivot in a vertical plane, with their outer ends at all times supported above the water by the floats 40.

When it is desired to retract either of the wing assemblies to clear a lateral obstruction, for example, the winch 20 is actuated to haul in the towline 18 on that side, causing the boom 36 to pivot in a horizontal plane and bring its outer end nearer the side of the vessel. When the obstruction has been cleared, the line 18 is again paid out, allowing the water pressure against the skirt portion 24 to swing the boom 36 out to the full extent permitted by the length of the line 18.

The booms 36 are preferably curved, as shown in FIG. 3, to conform generally to the contour of the portion of the side of the hull along which they lie when close hauled. The booms 36 thus can lie substantially flush against the sides of the hull, with the fabric portions of the wing assemblies being pulled into a compact bundle alongside the hull to minimize the drag on the vessel and the strain on the equipment when not in use.

The floats 40 may be made to function as paravanes by providing them with rudders 42 which are steerable by remote control from the vessel 12, for example by reversible electric motors contained with the floats and controlled by switches on a control panel located in the pilothouse of the vessel 12.

As will be understood, the embodiment of FIG. 3, having rigid booms, is best adapted for use to sweep a somewhat narrower path in relatively calmer water than the embodiment of FIG. 1. For somewhat rougher surface conditions, where the waves might wash over the top of the booms, it is desirable to modify the construction of FIG. 3 by detaching the leading edges of the cover 14 from the booms 36 except at their outer ends, and supporting the leading edges on floats 22, as in the embodiment of FIG. 1. This allows the leading edges to rise and fall with the undulations of the surface, even rising above the level of the booms 36 where necessary.

It will thus be appreciated that the present invention provides an apparatus which can readily be deployed when needed for a skimming operation and just as readily stowed when the operation is completed. For example, a boat having this equipment may be provided in every principal harbor for performing regular sweeping operations as well as for emergency removal of accidental spillage.

We claim:

1. For use with a marine vessel, apparatus for skimming a film of oily material from the surface of a large body of water comprising a pair of wing assemblies mounted at opposite sides of the hull of said vessel, each of said wing assemblies comprising a cover of flexible sheet material impermeable and impervious to oil, having its inner end connected to a rearward portion of the side of said hull, extender means to cause said cover to project outwardly and forwardly from its point of attachment to said hull, support means for supporting the leading edge of said cover member above the surface of the water to allow said oily material to pass beneath said cover whereby the trailing portions of said cover are supported on the floating film of oily material, said cover having at its trailing edge a skirt portion extending downwardly below the surface of the water to trap said oily material, said skirt portions being angled inwardly and rearwardly to funnel said oily material inwardly toward said vessel during forward movement of said vessel through the water, conduit means at the sides of the hull of said vessel having their input ends located beneath said covers and immediately forward of said skirt portions to receive said oily material, reservoir means for receiving said oily material from said conduits and storing the same, and lines extending from a forward portion of said vessel outwardly and rearwardly to the outer portions of said wing assemblies to allow said wing assemblies to be hauled closer alongside said vessel to reduce the width of the area swept and allow clearance of lateral obstructions.

2. Apparatus as described in claim 1 in which said support means comprises a series of float members spaced along and supporting the leading edge of said cover member.

3. Apparatus as described in claim 1 in which said extender means comprises a rigid boom whose inner end is connected to the side of said vessel by means which permits pivotal movement of said boom in both horizontal and vertical planes.

4. Apparatus as described in claim 3 in which said boom is curved to conform generally to the contour of the portion of the side of the hull of said vessel along which said boom extends when it is close hauled.

5. Apparatus as described in claim 1 in which said extender means comprises a paravane device connected to the outer end of said wing assembly.

6. Apparatus as described in claim 5 in which said paravane device includes a rudder steerable by remote control from said vessel to cause said paravane device to move inwardly or outwardly from said vessel as desired.

7. For use with a marine vessel, apparatus for skimming a film of oily material from the surface of a large body of water comprising a pair of wing assemblies mounted at opposite sides of the hull of said vessel, each of said wing assemblies comprising a cover of flexible sheet material impermeable and impervious to oil having its inner end connected to a rearward portion of the side of said hull, extender means to cause said cover to project outwardly and forwardly from its point of attachment to said hull, support means for supporting the leading edge of said cover member above the surface of the water to allow said oily material to pass beneath said cover whereby the trailing portions of said cover are supported on the floating film of oily material, said cover having at its trailing edge a skirt portion extending downwardly below the surface of the water to trap said oily material, said skirt portions being angled inwardly and rearwardly to funnel said oily material inwardly toward said vessel during forward movement of said vessel through the water, a bottom member of material readily permeable to water extending across the bottom of said wing assembly and connected to the lower edge of said skirt portion to prevent it from trailing rearwardly under the pressure of the water against it during movement of said vessel, conduit means at the sides of the hull of said vessel having their input ends located beneath said covers and immediately forward of said skirt portions to receive said oily material, reservoir means for receiving said oily material from said conduits and storing the same, and lines extending from a forward portion of said vessel outwardly and rearwardly to the outer portions of said wing assemblies to allow said wing assemblies to be hauled closer alongside said vessel to reduce the width of the area swept and allow clearance of lateral obstructions.

8. For use with a marine vessel, apparatus for skimming a film of oily material from the surface of a large body of water comprising a pair of wing assemblies mounted at opposite sides of the hull of said vessel, each of said wing assemblies comprising a cover of flexible sheet material impermeable and impervious to oil having its inner end connected to a rearward portion of the side of said hull, a boom extending along and connected to the leading edge of said cover, the inner end of said boom being connected to the side of the hull of said vessel at a point spaced above the waterline thereof by hinge means permitting pivotal movement of said boom in both horizontal and vertical planes and the outer end of said boom being connected to the top of a float which keeps said boom and the leading edge of said cover spaced above the surface of the water to cause substantially all of the oily material to pass beneath said cover whereby the trailing portions of said cover are supported on the floating film of oily material, said cover having at its trailing edge a skirt portion extending downwardly below the surface of the water to trap said oily material, said skirt portions being angled inwardly and rearwardly to funnel said oily material inwardly toward said vessel during forward movement of said vessel through the water, conduit means at the sides of the hull of said vessel having their input ends located beneath said covers and immediately forward of said skirt portions to receive said oily material, reservoir means for receiving said oily material from said conduits and storing the same, and lines extending from a forward portion of said vessel outwardly and rearwardly to the outer portions of said wing assemblies to allow said wing assemblies to be hauled closer alongside said vessel to reduce the width of the area swept and allow clearance of lateral obstructions.

9. Apparatus as described in claim 8 in which said boom is curved to conform generally to the contour of the portion of the side of the hull of said vessel along which said boom extends when it is close hauled.